A. E. KING.
HARROW.
APPLICATION FILED JAN. 10, 1917.
1,373,618. Patented Apr. 5, 1921.
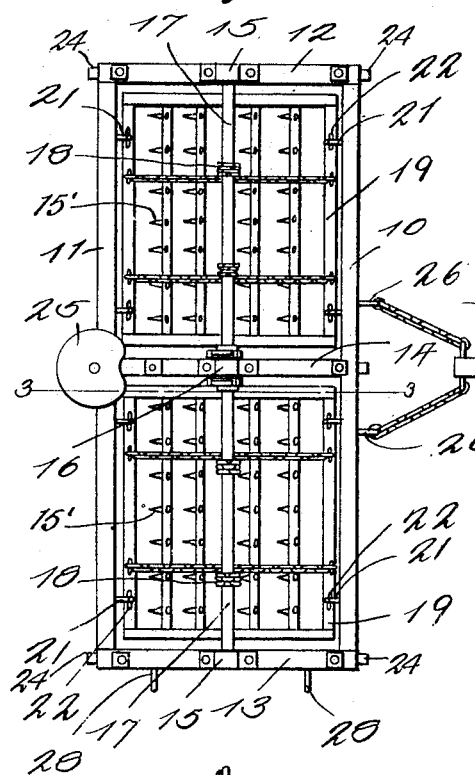
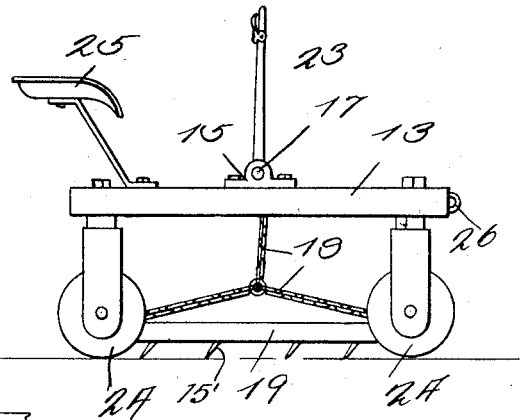
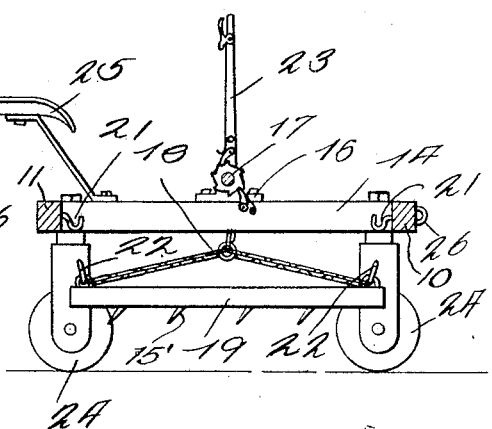
Witnesses
B. G. Brown
N. M. Fint
Inventor
A. E. King
By Charles Chandler
Attorney

UNITED STATES PATENT OFFICE.

AUSTIN E. KING, OF COLE, SOUTH DAKOTA.

HARROW.

1,373,618.  Specification of Letters Patent.  Patented Apr. 5, 1921.

Application filed January 10, 1917. Serial No. 141,600.

*To all whom it may concern:*

Be it known that I, AUSTIN E. KING, a citizen of the United States, residing at Cole, in the county of Perkins, State of South Dakota, have invented certain new and useful Improvements in Harrows; and I do hereby declare the following to be a full, clear, and exact description of the invention, such as will enable others skilled in the art to which it appertains to make and use the same.

This invention relates to improvements in agricultural machines, and particularly to harrows.

One object of the invention is to provide a simple and novel device of this character having a main frame mounted on wheels drawn along the surface and harrow frames suspended from the main frame so that they may swing to the rear and upward and then down and forward, causing their teeth to strike and break up lumps and to enter and work the ground.

Another object is to provide a harrow of this construction wherein the teeth are set at an angle so that they trail from the bars in their frames to avoid picking up lumps and trash.

Another object is to provide a device of this character which can be readily moved through narrow passages, such as narrow roads and narrow gateways.

Other objects and advantages will be apparent from the following description, when taken in connection with the accompanying drawings.

In the drawings:

Figure 1 is a top plan view of the harrow.

Fig. 2 is a side elevation of the same.

Fig. 3 is a section on the line 3—3 of Fig. 1.

Fig. 4 is a similar section showing the harrow frames in elevated position.

Referring now to the drawings, there is shown an elongated rectangular frame which includes the front and rear bars 10 and 11 and the side or end bars 12 and 13, the bars 10 and 11 being suitably connected by the bracing bar 14.

Mounted centrally on each of the end bars 12 and 13 is a bracket bearing 15, a similar bearing 16 being carried by the bar 14, and rotatably mounted in these brackets is a shaft 17 which extends the entire length of the frame, between the bars 10 and 11. Wound on this shaft 17 are chains 18 whose lower ends are branched and connected to the harrow frames 19. These frames carry harrow teeth 15' of any preferred construction, but they are set obliquely in their bars so that they shall trail when the entire device moves to the right as shown in the several views.

Carried on the inner side of each of the bars 10 and 11 are hook members 21 which are adapted to be engaged by eyes 22 carried by the harrow frames to support the said frames in elevated position. Also carried by the shaft 17 are the levers 23 by means of which the shaft is rotated to wind the chains and lift the harrow frame.

At each corner of the main frame, and at points where the bar 14 joins the bars 10 and 11 are caster wheels 24 which support the frame so that the same can be moved from one place to another when the harrow frames are in elevated position. Mounted on the rear portion of the bar 14 is a suitable seat 25 for the driver, and on the front bar 10 are hooks 26 to which the draft tongue 27 may be detachably engaged. The end bar 13 also carries hooks 28 for attachment of the tongue 27. This permits the harrow frame to be drawn lengthwise through narrow gate-ways, or along roads too narrow to accommodate the full length of the harrow, as well as to permit other vehicles to pass.

It will be seen that each harrow frame will be suspended below one end of the main frame by chains connected at four points with the former and at two points with the shaft 17 which extends over the center of the structure. Now when the harrow frame is let down as seen in Figs. 2 and 3, and the entire device drawn forward which will be to the right in those views, it is obvious that the contact of the teeth with the ground or the lumps thereof will knock the harrow frame to the rear, in which direction it is permitted to swing because it is flexibly supported. Immediately afterward the frame will swing back to the front, and in doing so its teeth 15' fall forcibly onto any other lumps which may exist or drop into the ground and work the latter. Thus in the progress of the machine over a field, the surface is worked by the teeth as they strike it a succession of blows. The rearward inclination of these teeth causes them to trail, with the result that lumps of earth or trash impaled on them incidentally will become automatically dislodged, so that the necessity for frequent cleaning is avoided.

What is claimed, is:—

In a harrow, the combination with a main supporting frame, means for attaching the draft thereto, a shaft journaled across said frame transverse to the line of draft, and means for adjusting the shaft in its bearings; of a plurality of harrow frames subjacent to the main frame and each carrying teeth inclined to the rear and trailing as the structure is drawn, and combined draft and adjusting chains wound on and depending from said shaft and branched to the front and rear corners of the respective harrow frames and constituting their only connection with the main frame, said shaft being midway between the front and rear ends respectively of the frames, for the purpose set forth.

In testimony whereof, I affix my signature, in the presence of two witnesses.

AUSTIN E. KING.

Witnesses:
 WILL S. PHELPS,
 SARAH J. CARROLL.